J. B. HOGE.
MUNICIPAL TRAFFIC CONTROL SYSTEM.
APPLICATION FILED SEPT. 22, 1913.

1,251,666.

Patented Jan. 1, 1918.
6 SHEETS—SHEET 5.

Fig. 5.

Witnesses
H. F. Lowenstein
James H. Marr

Inventor
James B. Hoge
By Edward E. Clement
Attorney

J. B. HOGE.
MUNICIPAL TRAFFIC CONTROL SYSTEM.
APPLICATION FILED SEPT. 22, 1913.

1,251,666.

Patented Jan. 1, 1918.
6 SHEETS—SHEET 6.

Witnesses
H. Löwenstein
James H. Marr

Inventor
James B. Hoge
By Edward E. Clement
Attorney

UNITED STATES PATENT OFFICE.

JAMES B. HOGE, OF CLEVELAND, OHIO.

MUNICIPAL TRAFFIC-CONTROL SYSTEM.

1,251,666.  Specification of Letters Patent.  Patented Jan. 1, 1918.

Application filed September 22, 1913. Serial No. 791,222.

*To all whom it may concern:*

Be it known that I, JAMES B. HOGE, a citizen of the United States, residing at Cleveland, in the county of Cuyahoga and State of Ohio, have invented certain new and useful Improvements in Municipal Traffic-Control Systems, of which the following is a specification, reference being had therein to the accompanying drawing.

My invention relates to municipal signaling, and has for its object the provision of a complete system for communicating with and controlling fire and police agencies and also the traffic through public streets and roads.

My system of signals, with some special arrangement and adaptations is intended to be used in conjunction with various known police and fire signaling systems, and to supplement the same so as to render them more economical and more efficient.

It is not unusual for speeds as high as 40 miles per hour to be attained by fire apparatus which means nearly 3600 feet per minute. Allowing for direct transmission of a sound signal, and that it could be clearly distinguished some distance ahead, the sound could only reach hearers 18 seconds ahead of the machine, and 18 seconds is not long enough for congested traffic, or any traffic, to clear a street and take the curb. Even when apparatus is traveling at lower speeds, it would have to carry very powerful signals to be sure of distinction above street noises, and great quickness and activity on the part of drivers and others to clear the street in advance of the apparatus, would be necessary.

Briefly stated, my invention comprises a completely organized intercommunicating system of signals, by which term I mean visual signals, aural signals, telegraph and telephone, between headquarters, substations for sending information to headquarters, (such as fire and police boxes or substations), substations for receiving orders and information from headquarters, (such as fire and police stations and police boxes), and traffic control stations.

In order to attain the object of my invention, I provide traffic control boxes or signals at street intersections and other suitable points (which may indeed include recurring points along an entire street), and arrange these signals for operation locally by traffic policemen at the street corners, on the curbs, or in the centers of street intersections, providing at these control points hand switches or buttons, or foot pedals, or both, and for communication with headquarters (fire or police), telephones and telegraph receiving instruments. Emergency signals, consisting of flash lights, or lights of different colors, are provided for local control, as well as whistles operated by compressed air, or the like, all of which may be actuated if desired direct from headquarters, or from another local traffic control point. If desired, the box signals may also be controlled from a distance through suitable circuit connections not shown. The traffic policemen are in constant communication with the centers and through them with all the outlying sensory portions of this completed system. Thus the traffic policemen are at all times informed as to the origin of fire signals and what probable routes will be used in answering the alarms, and can be instantly informed of any emergency out of the ordinary. The runs made by fire department apparatus in answering first alarms average between one-half and three-quarters of a mile. Apparatus answering second, third and fourth alarms must make longer runs.

By the use of this system it is possible to house the traffic men in their booths in bad weather, and heat the booths electrically if desired. By providing both manual and pedal control switches, I enable the traffic officer to operate both standing and sitting.

Similar reference characters on each of the figures of the drawing refer to similar connections and parts.

Figure 1:
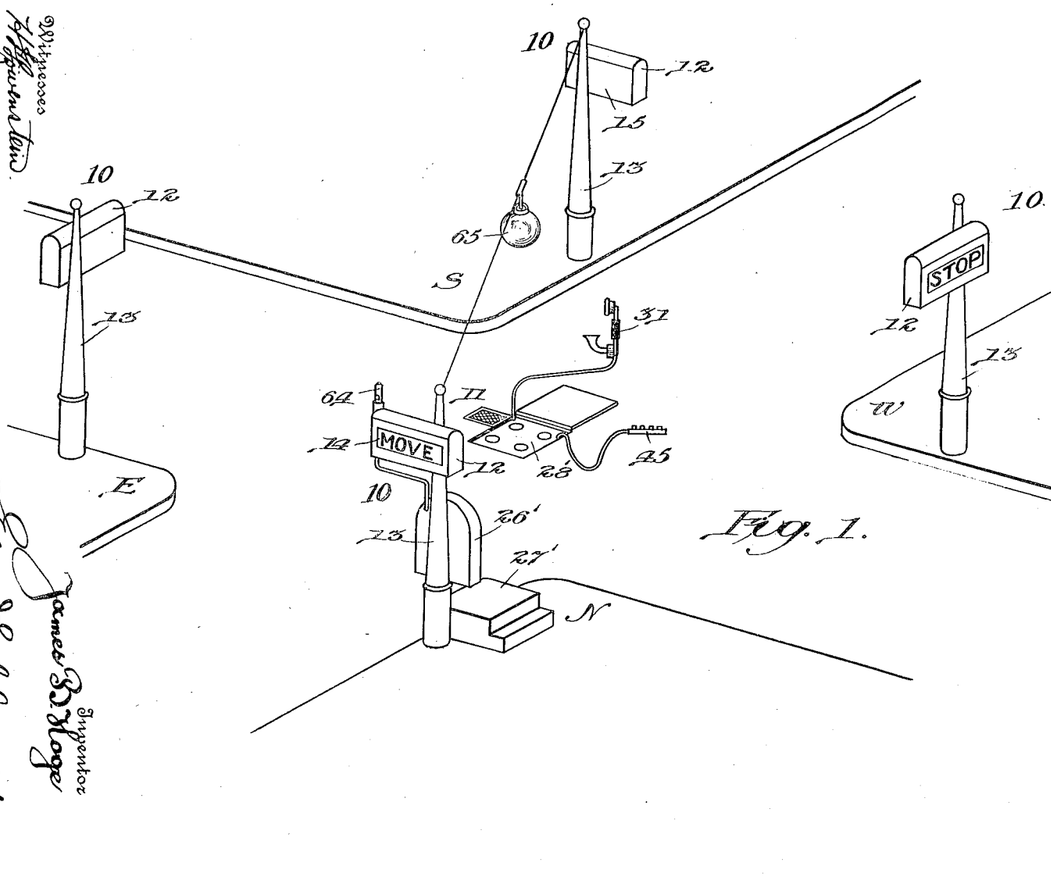
Figure 1 is a perspective view of a street crossing with the signals of the system of my invention installed.

Each traffic control station is preferably equipped with signals 10 as shown in Fig. 1. There is one of these signals on each of the four corners of the crossing designated respectively N. E. S. and W. In case of more corners additional signals may be placed, one on each corner. The signal may be of any of the well known types of electrically controlled signals in use in railway signaling systems. I prefer to use an annunciator of the movable curtain type 10 (Fig. 5) mounted in a box 12 near and over the street or road on a pole such as 13, which may be one of the corner poles used by the street railway or light or other wire-using company.

The curtain 11 carries the word "Move" and the partition 11½ carries the word "Stop," the former (11) being vertically movable by mechanism within the box or at other suitable points displaying the word which it carries through the window 14 in front of casing 12. When the movable curtain is drawn up on drum 17 the partition 11½ comes into view through the window 14. The backs 15 of the casings 12 are opaque whereby the signals can only be seen from the front, and the casing 12 and the surfaces of the parts 11 and 11½ are in planes at right angles to the direction of the traffic which they control, whereby the signals can be clearly read from all points from which they are approached. The location of the signals on the corner posts is preferably of such height as to elevate them above the top of the tallest vehicles permitted to be used upon the city streets. The casing 12 is provided with a storm and sun shield to protect the window 14 under which are located lights, plain or of different colors, which may be automatically cut in and cut out day or night as the curtain 11 is moved. The mechanism for operating the curtain may be any one of a number of types, but I prefer that shown in connection with Fig. 5. Within the box 12 the curtain 11 is hung back of the glass front of the box and made to wind up on drum 17. The curtain is weighted on the end by iron rod 18 and runs over roller 16. When coil 21 is energized it pulls plunger 22 and connecting rod 20 down, causing gear 27 to operate pinion 19 which is fastened to drum 17. A reflecting lamp 25 lights the curtain.

Figure 5:
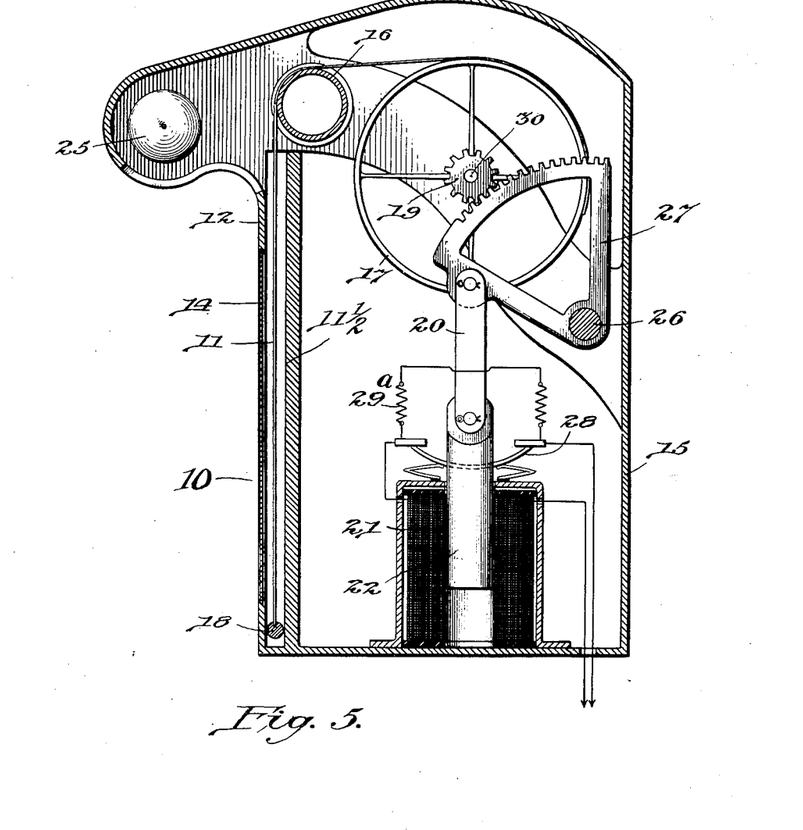
Fig. 5 is a sectional view of a traffic control signal box.

When plunger 22 is all the way down switch 28 is opened by the projecting end of the lower pivot pin between members 20 and 22, removing the shunt normally existing around the resistance 29ª, leaving said resistance 29ª in series with coil 21. The function of this resistance is to cut down the current passing through the coil 21 during its continued energization, and the short circuiting switch is provided so that the initial current required for operation of the coil will not have to pass through the resistance. When current is cut off 21 the weight of iron rod 18 pulls curtain down.

In casing 12 shaft 26 is provided for pinion 27 and shaft 30 is similarly provided for pinion 19 and drum 17.

All signals 10, which it will be noted, are on the near side of the crossings which they protect, are under the direct control of the traffic policeman through the control box 26' mounted upon one of the signal posts as shown, or in a booth or tower. An elevated platform 27' may be provided for the traffic policeman to stand upon in operating these signals, the elevation of the platform being such that he can see above the heads of pedestrians and vehicle drivers. It may be advisable in some instances to have this booth, platform, or tower, elevated so that the policeman may see over the tops of vehicles of average size, in which case it will be advisable to place control box 26' in a suitable booth such as used in connection with railway systems in certain cities, said booth to be located on the sidewalk or elevated in the middle of the street. The location of the platform 27', or the booth which takes its place, on the sidewalk, has the advantage of enabling the traffic policeman to be interviewed by pedestrians when desired, without danger. In some instances, however, it may be advisable for the traffic policeman to go to the middle of the street; to this end when so desired I provide a control box 28' in the center of the crossing, and containing control means in multiple with the control devices in the box 26'.

With this understanding, the crossing signal apparatus system at large, and its comprehensiveness, can be readily understood.

Figure 2:
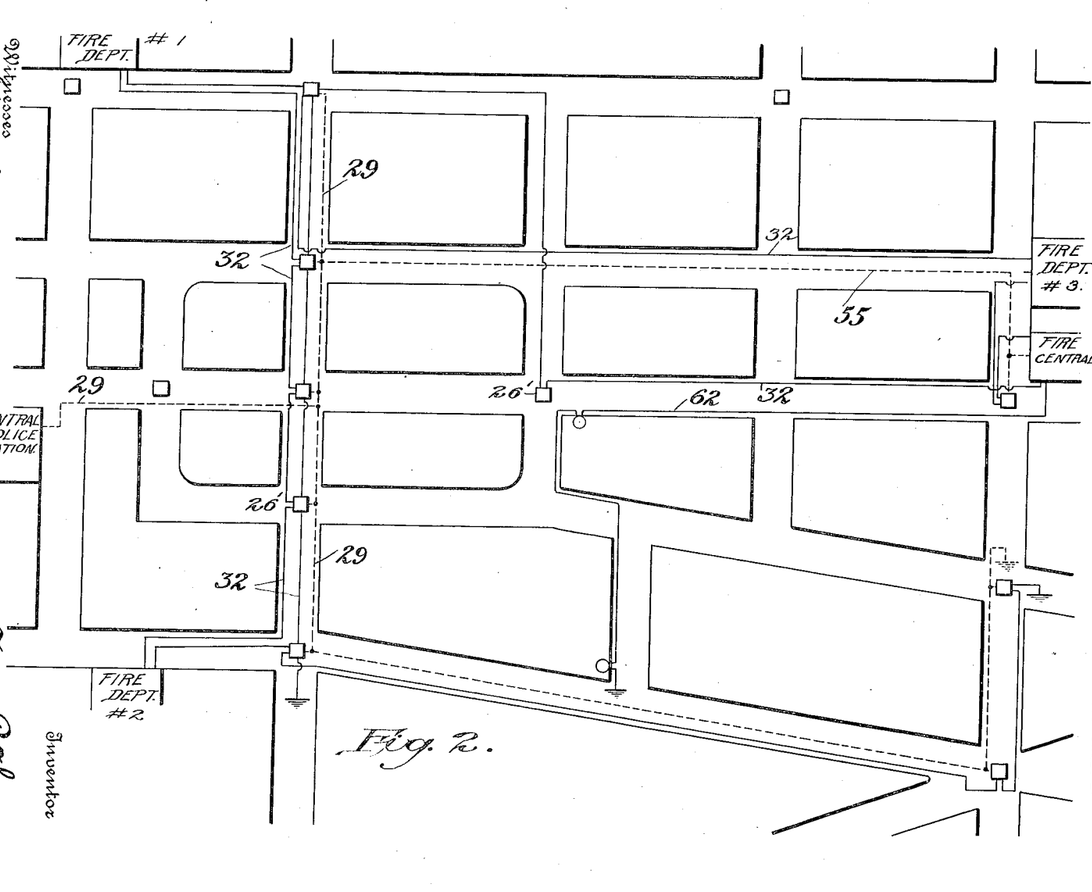
Fig. 2 is a plan of the business section of a city showing fire and police central stations, together with a plurality of traffic control stations and fire and police telegraph and telephone connections thereto.
Figure 4:
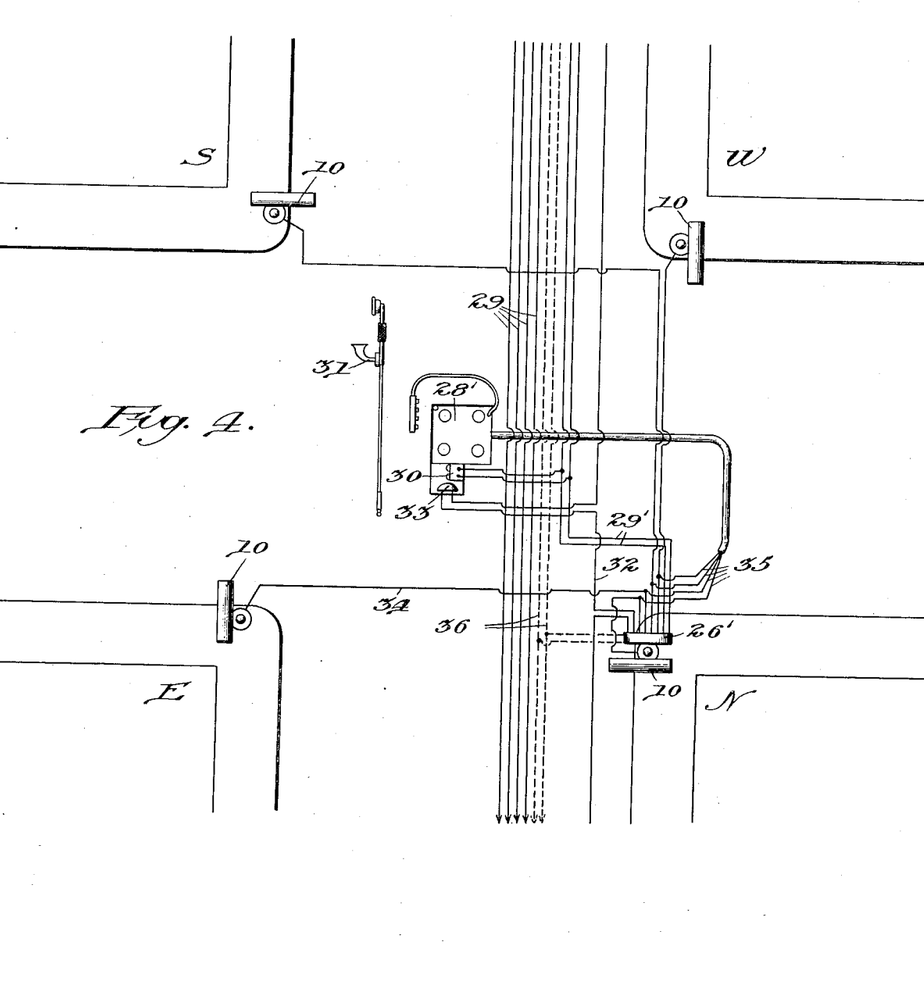
Fig. 4 is a plan view showing that portion of the system comprising the signals and the various connections thereto at a single station.

In Fig. 2 a general layout of the system is shown. In this also are located the fire department central at the east, the central police stations at the west, and fire department companies Nos. 1, 2 and 3. At each station where there is to be located a traffic policeman there are placed a set of the signals 10 as just described, and the control box 26'. For the sake of clarity these signals 10 are not shown, but the control boxes 26' are indicated by small squares. Each of the control boxes (of as many as may be desired) is in telephonic connection with the central police over the telephone circuit shown in dotted lines. This telephone connection where desired, can also be extended to the central office of the fire department. All of these boxes (or as many as may be desired) are also connected by the full line connection shown with the fire department central, and each station connected is provided with a fire telegraph signal receiving apparatus, whereby the traffic policeman in charge is signaled from the central fire station and may properly control the several crossing signals. The circuit connections from the police telephone and fire telegraph to the signals and their controls at the crossings, are diagrammed in Fig. 4. Police telephone lines extending past the crossing are numbered 29. One pair of these 29′ is multipled into the control box 26′ on the sidewalk, and also to the ringer 30 in the street control box 28′. Thus a traffic policeman may be rung up either when upon the sidewalk or in the middle of the street. By means of a portable telephone set 31, which he may carry suspended upon his belt or in his pocket, he may connect with the telephone at the box 28′ and talk from the street, or he may go to the sidewalk and use the permanent telephone. The fire alarm lines are designated 32. The fire repeating apparatus located in the box 26′ is connected in series with the line 32 as is also a fire gong 33 in the street box 28′, whereby fire alarm signals are also repeated in box 26′ and in box 28′. Connections 34 extend from the sidewalk box 26′ to the several signals 10 and are multipled by conductors 35 to the street control box 28′ whereby the signals may be controlled, when desired, from either point. Power for operating the signals may be supplied from any source of energy through power mains 36.

Figure 3:
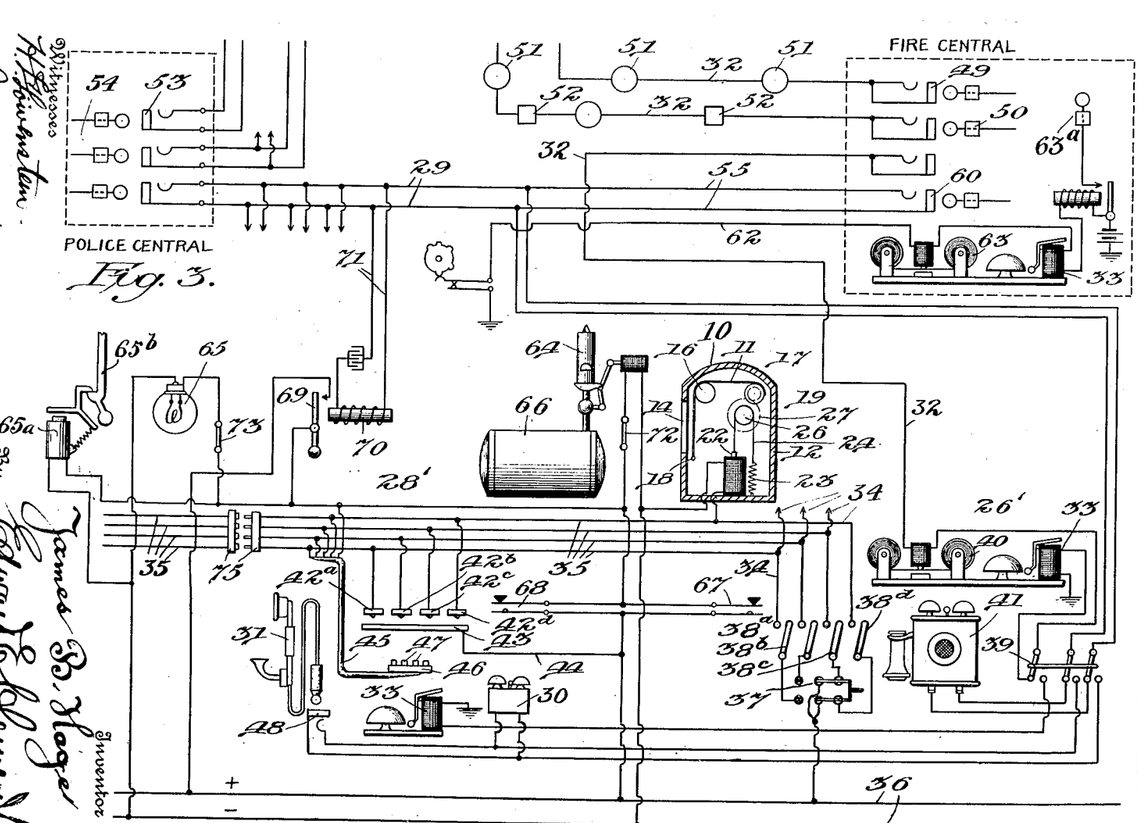
Fig. 3 is a diagrammatic illustration of the system as a whole.

Referring now to Fig. 3, the apparatus in control box 26′ comprises double pole double throw switches 37 connected with power main 36 and also with single pole single throw switches connected with $38^a$, $38^b$, $38^c$ and $39^d$ for controlling the signals 10 over connections 34, a three pole double throw switch 39 for shifting telephone and fire alarm connections from the sidewalk box 26′ to the street box 28′, fire alarm telegraph receiver 33, and police telephone 41 of the box 26′ being disconnected and the corresponding parts marked 33 and 30—31—48 in the street box 28′ being connected in their places. The street box 28′ to which multiples 35 of connections 34 extend rests flush with the top of the pavement and contains a plurality of buttons or pedals $42^a$, $42^b$, $42^c$ and $42^d$, or more when desired, which are adapted for operation by the foot of the policeman and connect any desired multiple 35 with the source of power through the common bar 43 and conductor 44. Additional multiples 35 are carried through flexible cable 45 to a hand controlled switch 46 having four or more buttons 47 corresponding to the four or more foot switches $42^a$ to $42^d$. Additionally, the street control box contains telephone ringer 30, jack 48, portable telephone set 31 adapted to be connected therewith, and fire alarm gong 33.

The fire alarm central office contains a plurality of jacks 49 and plugs 50 of the usual type, the former connecting with the fire alarm telegraph lines 32 which extend over various traffic routes and to the various engine houses, the latter of which are adapted to connect with the despatcher's signal transmitting apparatus, which may be of any of the usual types and is not shown. In fact the lines 32 may be connected permanently with parts of a fire alarm repeating system, which may be either automatic or manual, such as used in progressive cities. Along the lines 32 are shown a plurality of fire department stations 51, designated by circles, and a plurality of traffic control stations 52, each provided with control boxes 26′ and 28′, containing apparatus just described.

It is customary in handling the fire apparatus of the various large cities for the despatcher at fire headquarters when receiving a fire alarm to repeat the same over the line, which I designate as 32, to all the enginehouses, fire officials, and others which are located on one or more circuits extending in general throughout the city. My plan contemplates running these circuits into the street control stations Nos. 26′ and 28′, and installing therein repeating gongs, which are hereafter described, which will enable the traffic officer on duty to read the alarms the same as they are now read in the several stations and be able to tell from information previously furnished him what departments will respond, what routes they will take, etc., so that he may act intelligently when necessary to clear the streets.

The police telephone station comprises a set of the usual telephone apparatus indicated by jacks 53 and plugs 54, the jacks 53 connecting with various telephone circuits 54 extending some of them to the ordinary police call boxes commonly used in cities, and others of them to the traffic control stations 52 preferably paralleling the fire alarm telegraph lines wherever it is desired to communicate with all the stations 52 on a given route. Also certain of the lines 54 may be provided with extensions 55 to jacks 60 in the fire central station, whereby the traffic control stations may be communicated with from the fire central as well as from the police central.

At the traffic control station 52 in connection with the signals 10 are provided the emergency signals 64 and 65, the one any form of mechanical or aural signal, preferably a whistle operated from a tank of compressed air 66, and the other a light of high power operated from the mains 36. Manual control keys 67 or 68 are provided respectively at the booth 26' and control station 28' for controlling these signals, as indicated diagrammatically in Fig. 3. In multiple with these switches 67 and 68 is the armature 69 of an electro-magnet 70 connected with the telephone circuit 29 by circuit 71 adapting magnet 70 for energization by current of a special character only.

The operation of the system is as follows: As long as the traffic is normal, the traffic policemen at the various traffic control stations operate the signals 10 in one direction or the other to control the traffic as conditions judged by them require. In operating from the sidewalk box 26', it will be apparent that by throwing in one of the single pole switches 38$^a$ to 38$^d$, the policeman may operate any desired one of the signals 10, and when so operated, the signal will move from its "stop" position to its "move" position, or vice versa. The double pole double throw switch 37 is connected as shown in Fig. 3, so that but one pair of diagonally opposite signals can be connected to the power mains 36 at a time. In each case the pair of switches so connectible is the pair governing traffic on the same street. Thus with the switch 37 closed to the righthand pair of contacts 38$^c$ and 38$^d$ as shown, the signals 10 on diagonally opposite corners such as N and S (north and south), Fig. 1, only may be closed. It is therefore impossible for a policeman to throw a line of traffic at 90° to another line of traffic and thereby cause confusion and accidents. However, by manipulating the switches 38$^c$ and 38$^d$, the switch 37 remaining in the position shown, he may limit traffic to one direction only, as for instance north, while stopping the traffic in the other direction, south. Thus in case of very heavy traffic due to congested conditions at the crossing, it may be handled in small portions. Not until the policeman throws the double switch 37 to the left, can the east and west signals controlled by switches 38$^a$ and 38$^b$ be operated to permit the traffic east and west to move. In case of fire the traffic policeman receives the signal on his fire alarm receiver 40, and if the fire apparatus in his district is to move he immediately proceeds to clear the route. By manipulating his key 67 or 68 he sounds the emergency whistle 64 and flashes the emergency light 65, and may use his emergency flag. In such case it will be understood by all drivers that vehicles are not only to be stopped, but are to be moved to the curb at once so that the street may be perfectly clear for the passage of the fire company, or other emergency equipment. Single pole switches 72 and 73 are shown in connection with signals 64 and 65 whereby they may be individually cut out when desired, since it may be desired to dispense with the light during the daytime or with the whistle at night. At the same time the traffic policeman is advised of the location of the fire, the number of the box calling being sounded on his instrument 40 simultaneously with the striking of the gong as is usual. He may thus, if called upon, attend the fire himself or advise other officers on duty of the location of the same.

In case of second, third or fourth alarms where there is a large amount of apparatus going to the same point, or in case of other extreme emergency, the emergency signals may be operated from the fire station or from the police station independently of the traffic policeman. This is done by placing current of special character adapted to operate magnet 70 upon telephone conductors 29. This causes magnet 70 to attract its armature 69 and to operate both the whistle 64 and the light 65. Suitable automatic apparatus may be used for supplying this current of special character at intervals, whereupon the signals are sounded intermittently and automatically, until the apparatus is cut off. Such automatic ringing is very common and well known in telephone exchange systems.

During the period of their duty, the traffic policemen may be called from either the central police station or the central fire station, and in turn may themselves call either of those stations at will, whereby they may be given special instructions upon any desired subject. Thus any unauthorized traffic may be stopped, upon direction from the central station, information as to escaping thieves and criminals may be given, reports transmitted by the policeman to the central police station, calls for assistance may be sent in by him, and special information of any kind for instance as regards the passage of apparatus and the particular character of any emergency, may be transmitted to the central fire station. In each of these several respects, the utility of my system is apparent, as well as its novelty.

In case the traffic policeman goes to the street to control his signals from the street box 28', he opens switches 37 and 38$^a$ to 38$^d$ and shifts the three pole switch 39 before leaving the box 26'. At any time during his control from the street box 28' he may use the hand control 46 which through its flexible connection 45 enables him to move about in the neighborhood of the box 28' instead of being confined to it as he is when he operates the signals by the foot switches 42$^a$ to 42$^d$. Through the switch 68 the emergency signals 64 and 65 may be operated from the street as well as from the sidewalk.

In case of light load, the system permits the unitary operation of two or more adjacent traffic control stations. To this end the multiples 35 from conductors 34 to two or more adjacent stations may be joined together by a plug 75, which plug is preferably located in the sidewalk control box 26', the multiples 35 from one station being extended all the way to the other. There would preferably be provided one of these multipling plugs 75 at each control station.

Figures 6, 8:
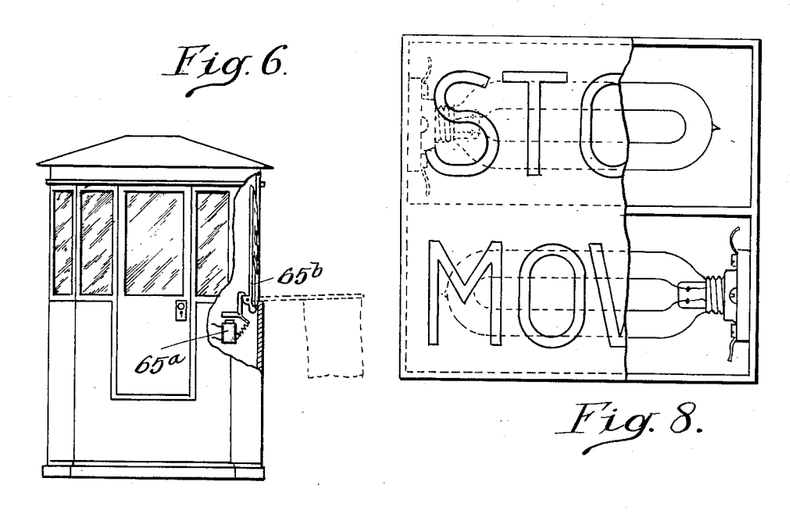
Fig. 6 is a view of a traffic officer's booth showing an automatic emergency flag adapted to be dropped into view when the emergency whistle or other signal is sounded.
Fig. 8 is a front view of a modified signal in which the lamps are placed back of the two-faced sign, one face displaying the word "Stop" and the other the word "Move."

It should be understood that the foregoing description is specific for purposes of definition only, and not for limitation. A great many changes and alterations can be made and will occur to those skilled in the art, without departing from the spirit of my invention. A few modifications will be indicated. The box 12 in Fig. 1 is shown mounted on the pole 13, although any other arrangement for holding the box 12, that would suggest itself to those skilled in the art, may be used. Regarding the emergency flag used by the traffic officers, in case the emergency light is not readily seen in the day time, it is possible for the traffic officer to have a red flag which he can hang out of his booth when the whistle is blowing, but I prefer such a flag mounted on a pivoted socket or drop member 65$^b$ normally latched in retired position, but unlatched and dropped down into view by an electromagnet 65$^a$ connected to the same circuit as that for the emergency signal described. I preferably make the electric whistle or gong so as to have a distinctive tone, either by tuning it, or by producing a chime effect, which can be readily recognized and covered by city ordinance forbidding its use by automobiles or otherwise. In cities where it is the rule not to permit traffic to turn at street intersections, compelling vehicles to go past the street desired, then turn, go back, and enter the desired street on the right-hand side, the traffic signals described are operated with double pole double throw switch only, one operation being necessary when changing from one street to the other. It should be noted that it is unnecessary to stop traffic when changing from the control box 26' to 28'.

Figure 7:
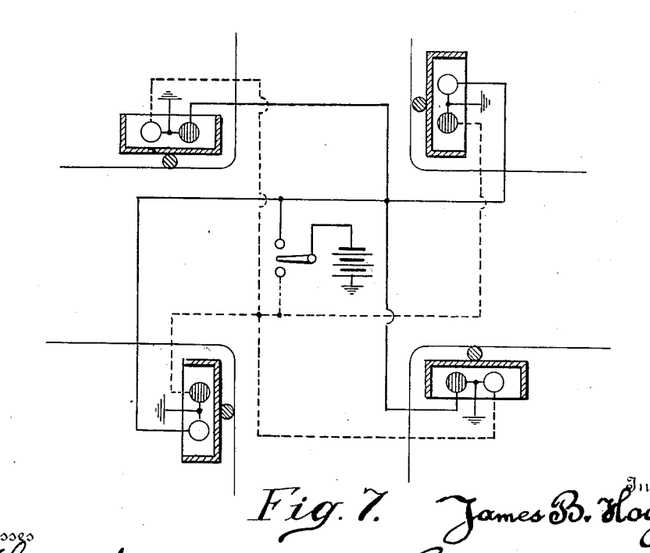
Fig. 7 is a diagram showing the method of arranging lamps of different colors adapted to be displayed in sets, each set comprising one lamp of a distinctive color for each intersecting street.

It is important to understand that for handling traffic, I contemplate using lamps in the signal boxes or mounted on the street posts, without any wording or any movable parts, the lamps being of different colors, one color indicating "stop" and the other "move". This simplifies the circuit, because when one set of lights is turned on it will display one signal, and the other set the other, and the lamps of opposite colors for two intersecting streets may be connected with the same wires in parallel, that is to say the red lamps of a north and south street white lamps of the east and west street may be on the same circuit, and vice versa. Thus by closing one switch the red lamps of one street and the white lamps of the other are lighted, and by opening that switch and closing another the reverse is true, or one double throw switch may be employed. In case of emergency the whistle or gong is sounded and the red lights are flashed at intervals, say every two or three seconds. This would eliminate the necessity of having the emergency light over the street. Another modification of the signal is to put the lamps in front of reflectors back of a two-faced sign, one face displaying the word "Stop" and the other the word "Move", both faces being in the same plane if desired. When one set of lights is turned on, one signal is illuminated, and the other illuminates the other set.

It is to be understood that I contemplate all non-essential changes as fairly included within the scope and purview of the following claims.

What I claim and desire to secure by Letters Patent is:

1. In a municipal traffic control system, traffic control signals above a roadway, and actuating means therefor comprising pedals mounted flush with the roadway, whereby the operator may control the signals while on his feet.

2. In a traffic control system, an elevated signal, and a controlling equipment therefor comprising a circuit closer located at the feet of the operator and adapted for pedal operation, and an alternative circuit closer elevated above the level of the pedal circuit closer for convenient manual operation by the same operator, both circuit closers being connected in parallel to the same circuits leading to the elevated signal.

3. In a traffic control system, an elevated signal, and a controlling equipment therefor comprising a circuit closer located at the feet of the operator and adapted for pedal operation, and an alternative circuit closer elevated above the level of the pedal circuit closer for convenient manual operation by the same operator, both circuit closers being connected in parallel to the same circuits leading to the elevated signal, together with means for shifting the circuit control from one circuit closer to the other.

4. In a municipal traffic control system, start and stop signals positioned above a roadway, an emergency signal also suspended above the roadway, means on the level of the roadway adjacent to said signals connected to and adapted to control the start and stop signals, other means also adjacent thereto connected to and adapted to control said emergency signal, controlling means for said emergency signal located at a distance therefrom, and connections therefrom to the signal, whereby the same may be operated either locally or from a distance for emergency purposes.

5. A traffic control system comprising traffic signals positioned above a roadway, a booth in proximity to the roadway, an additional traffic controlling signal on the booth, a source of current for all of said signals, separate circuit connections from the source of current to the signals and individual circuit controlling devices at the booth for all of said circuits, together with branch circuit connections for the additional signal, leading to a distant point with circuit closing means at said point for controlling said signal therefrom.

6. In a traffic control system, signal devices positioned above two intersecting roadways in proximity to their intersection, one set of signals visible along and controlling traffic in both directions through one road, and the other set in both directions through the other road, a source of current and separate circuit connections therefrom to said signals, with interlocking circuit closing means for the respective pairs of circuit connections, so arranged that the circuits of only one set of signals, appropriate to one road, can be closed at the same time, whereby confusion of traffic is prevented.

7. In a traffic control system, elevated electric signals in two sets, respectively associated with and visible along each of two intersecting roadways, a source of current and circuit connections therefrom to each of said signals, a circuit closer for each signal, and a master circuit controlling device associated with said circuit closers and adapted to supply current therethrough to only one set of similar signals at the same time, whereby confusion in traffic is avoided.

8. In a municipal traffic control system, start and stop signals in two sets positioned above and respectively appropriated to two intersecting roadways, one pair of start and stop signals arranged to be visible in each direction along each roadway, in proximity to the intersection, a source of current and circuit connections for said signals, separate circuit closers for the start and stop signals, working in opposite pairs, whereby the start signals will be exhibited for one roadway when the stop signals are exhibited for the other simultaneously, and an interlocking switch controlling the current supply to said circuit closer, and having separated contacts connected to the opposite related pairs of on and off signals, with means adapted to close said contacts alternately but inoperative to close them simultaneously.

9. In a municipal traffic control system, a plurality of pairs of electric lights, each pair of different colors, and opposite pairs positioned above and visible along two intersecting roadways, a source of current and connections from said source to said lamps, a booth in proximity to the intersection of the roadways, separate circuit closers for said lamps in said booth working in opposite pairs, and a master switch having separate fixed contacts connected to similar lamps of opposite groups, and a movable contact cooperating alternately with said fixed contacts to control the current supply to the lamps, whereby conflicting signals cannot be set.

10. In a municipal traffic control system, intersection signals comprising four pairs of electric lights, each pair of different colors, constituting start and stop signals, two pairs positioned above so as to be visible along one roadway, in opposite directions, the other two pairs positioned above so as to be visible along the other or intersecting roadway in opposite directions, the first two pairs being on opposite sides of the intersection, and the opposite sides of the street to which they are appropriated, and the second two pairs being similarly on opposite sides of the intersection and on opposite sides of the street to which they are appropriated, whereby each pair of signals can be used to control traffic toward the intersection in one direction along one street only, a source of current and circuit connections therefor to all of the signals, separate circuit closers for each signal and for each pair, and a master circuit closer supplying current alternately to similar signals of opposite pairs on the same street only, whereby switching together of 90° traffic is rendered impossible.

In testimony whereof I affix my signature in presence of two witnesses.

JAMES B. HOGE.

Witnesses:
 EDWARD E. CLEMENT,
 JOHN P. TARBOX.